(12) United States Patent
Marks et al.

(10) Patent No.: US 10,475,332 B2
(45) Date of Patent: Nov. 12, 2019

(54) SPATIAL REMOTE CONTROL

(71) Applicant: Sony Interactive Entertainment Inc., Tokyo (JP)

(72) Inventors: Richard Marks, Pleasanton, CA (US); Joshua Michael Eads, Palo Alto, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/793,232

(22) Filed: Oct. 25, 2017

(65) Prior Publication Data

US 2019/0122538 A1    Apr. 25, 2019

(51) Int. Cl.
*G08C 17/02* (2006.01)
*H04B 1/20* (2006.01)
*G08C 19/28* (2006.01)

(52) U.S. Cl.
CPC ............. *G08C 17/02* (2013.01); *H04B 1/20* (2013.01); *G08C 19/28* (2013.01); *G08C 2201/21* (2013.01); *G08C 2201/42* (2013.01); *G08C 2201/91* (2013.01); *G08C 2201/92* (2013.01)

(58) Field of Classification Search
CPC .................................. G08C 17/02; H04B 1/20
USPC .............................................. 340/12.22, 12.11
See application file for complete search history.

(56) References Cited

U.S. PATENT DOCUMENTS

| | | | |
|---|---|---|---|
| 8,287,373 B2 | 10/2012 | Marks et al. | |
| 2008/0129445 A1* | 6/2008 | Kraimer | B66F 9/07581 340/5.2 |
| 2009/0322582 A1* | 12/2009 | Baugh | G08C 17/02 341/176 |
| 2011/0095978 A1* | 4/2011 | Pehlivan | G08C 17/00 345/158 |
| 2011/0248877 A1* | 10/2011 | Karaoguz | H04L 41/12 341/176 |
| 2013/0300546 A1* | 11/2013 | Kim | G08C 19/00 340/12.22 |

OTHER PUBLICATIONS

"International Search Report" and "Written Opinion of the International Searching Authority," Patent Cooperation Treaty Application No. PCT/US2018/056788, dated Nov. 20, 2018, 10 pages.

* cited by examiner

*Primary Examiner* — Qutbuddin Ghulamali

(74) *Attorney, Agent, or Firm* — Carr & Ferrell LLP

(57) ABSTRACT

The disclosure provides methods and systems for spatially remote controlling a network controllable device in a physical user environment. An exemplary method may include tracking, by a processor, a position and orientation of a remote control device based on sensor data. The sensors may be one or more of a gyroscope, accelerometer, and a magnetometer. Based on the tracking, a ray extending from the remote control device in a direction the remote control device is pointing is determined. The determined ray is compared to a predefined map, the predefined map including a spatial location associated with each of one or more network controllable devices. The method may include, based on the comparing, selecting a network controllable device of the one or more network controllable devices corresponding to the determined ray. In response to receiving a user input, a control signal is then transmitted to the selected network controllable device.

21 Claims, 5 Drawing Sheets

SPATIAL REMOTE CONTROL

FIELD

The present technology relates generally to spatial remote control of devices, and more particularly to spatially mapping devices in a physical user environment and controlling the devices based on a spatial location.

BACKGROUND

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

Internet of Things (IoT) devices, such as smart lights and thermostats, are becoming increasingly common in the home. Each IoT device is typically controlled by a web application or mobile application, which refers to a default name or user defined designation for the IoT device. With even a few IoT devices, however, it becomes increasingly difficult to identify which designation refers to which physical IoT device and to control the various IoT devices. As such, there exists a need for an intuitive and efficient way to select and control devices in a physical user environment.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Generally, the present disclosure is directed to technology for spatially remote controlling one or more network controllable devices. Some embodiments of the present disclosure may allow a user to select and control a network controllable device based on a spatial location by pointing and activating a user input on a remote control device. A spatial location of each network controllable device coupled to a network may be stored in a predefined map.

According to one embodiment of the present disclosure, provided is a computer-implemented method for spatially remote controlling a network controllable device in a physical user environment. An example method includes tracking a position and orientation of the remote control device based on sensor data, and, based on the tracking, determining a ray extending from the remote control device in a direction the remote control device is pointing. The method further comprises comparing the determined ray to the predefined map, based on the comparing, selecting a network controllable device that corresponds to the determined ray, and, in response to receiving a user input, transmitting a control signal to the selected network controllable device. Exemplary network controllable devices may include a smart light, a speaker, a television, a thermostat, a camera, a meter, an irrigation system, and a door lock.

In some embodiments, the method further comprises constructing the predefined map. The predefined map may be constructed by determining, based on the position and orientation of the remote control device, a plurality of boundaries of the physical user environment, receiving a list of the one or more network controllable devices coupled to a network, and determining, based on the position and orientation of the remote control device, the spatial location associated with each of the one or more network controllable devices. A wall boundary may be determined based on an intersection of a determined floor boundary and the determined ray. Furthermore, the list may include a device identifier and a type of device for each of the one or more network controllable devices. The method may further comprise activating each network controllable device in turn, as the spatial location of each network controllable device is being determined. Determining the spatial location associated with each of the one or more network controllable devices may include determining a point along the ray corresponding to a physical location of the each of the network controllable devices.

The method may further comprise generating a graphical user interface to display the predefined map as the predefined map is being constructed. The graphical user interface may include at least one of the plurality of boundaries, and/or currently calculated positions of the ray and the spatial location associated with each network controllable device in real time.

In some embodiments, comparing the determined ray to the predefined map, and selecting a network controllable device that corresponds to the determined ray includes calculating a point-line distance between the ray and each spatial location, and determining which network controllable device is disposed closest to the ray. In certain embodiments, the comparing and selecting include calculating a volume centered about the ray, determining whether each spatial location stored in the predefined map is disposed within the volume, and determining which network controllable device is disposed closest to the remote control device.

According to another aspect of the present disclosure, provided is a system for spatially remote controlling a network controllable device in a physical user environment. The system comprises a remote control device, a network coupled to one or more network controllable devices, at least one processor and a memory. The remote control device may include one or more sensors including one or more of a gyroscope, accelerometer, and a magnetometer. Collectively, the at least one processor and memory can be configured to track a position and orientation of the remote control device based on sensor data, determine a ray extending from the remote control device in a direction the remote control device is pointing, compare the determined ray to a predefined map, and based on the comparing, select a network controllable device of the one or more network controllable devices corresponding to the determined ray. The predefined map may include a spatial location associated with each of the one or more network controllable devices. The at least one processor and memory may further be configured to receive a user input and transmit a control signal to the selected network controllable device. In certain embodiments, the user input includes one or more of a button actuation, voice control, movement of the remote control device, and a gesture. In certain embodiments, the system may further comprise a camera system coupled with the remote control device.

BRIEF DESCRIPTION OF THE DRAWINGS

Embodiments are illustrated by way of example, and not by limitation in the figures of the accompanying drawings, in which like references indicate similar elements.

DETAILED DESCRIPTION

Figure 1:
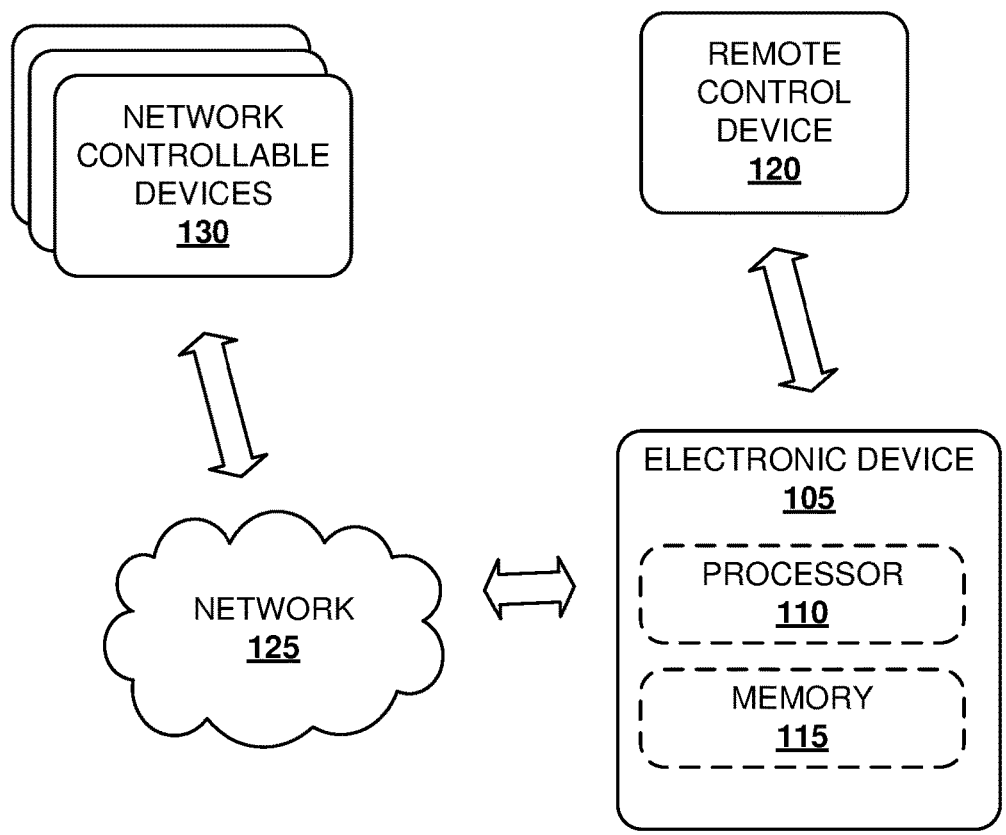
FIG. 1 shows an example system architecture of a spatially remote controllable environment.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents.

The techniques of the embodiments disclosed herein can be implemented using a variety of technologies. For example, the methods described herein are implemented in software executing on a computer system or in hardware utilizing either a combination of microprocessors or other specially designed application-specific integrated circuits (ASICs), programmable logic devices, or various combinations thereof. In particular, the methods described herein are implemented by a series of computer-executable instructions residing on a storage medium such as a disk drive, or computer-readable medium. It should be noted that methods disclosed herein can be implemented by a cellular phone, smart phone, computer (e.g., a desktop computer, tablet computer, laptop computer), game console, handheld gaming device, and so forth.

In general, various embodiments of the present disclosure are directed to methods and systems for defining maps of devices in a physical user environment, and spatially remote controlling a device in a physical user environment. In various embodiments, spatial remote control enables a user to activate or otherwise control devices based on pointing to, or otherwise indicating, a physical location of the device to be controlled.

For example, a user may physically place a plurality of devices throughout the physical user environment, and couple the devices to a network. The devices may be communicatively coupled directly to the network, or via a central hub or other suitable networking device. Once coupled to the network, each device is referenced by a device identifier, either user-defined name or other predetermined name such as a factory model number. Via conventional systems, a user may have access to a list of device identifiers, selecting a device to activate or otherwise control by selecting the particular device identifier from the list. When the number of available IoT devices increases, however, selecting a particular device based on a device identifier becomes increasingly challenging. For example, if a room in a user's home contains a large plurality of devices, many of which are the same type of device such as lights, the user may have difficulties sorting between devices, even with text descriptions, and thus have difficulty variously controlling each device. Thus, systems and methods of the present disclosure offer intuitive ways to select and control various devices based on a spatial location of each device, rather than a text-based identifier.

In some embodiments, the remote control device is a smart phone or other smart mobile device, such that, in response to a user pointing the smart phone at a more complex IoT device (e.g., thermostat, stereo, etc.), instead of directly performing an action on the IoT device, the action may be to launch a corresponding application ("app"), on the mobile phone, for that IoT device. For those embodiments, the spatial action of pointing at the IoT device functions like a shortcut for finding the proper app on the smart phone that corresponds to that IoT device. The app may be configured with information for the particular device at which the user is pointing. There may be a number of apps on the smart device, each corresponding to a particular IoT device or category of IoT devices with each app configured with information for a corresponding IoT device or category of IoT devices. For example, in response to a user pointing a smart phone at the user's home stereo and pressing a button, a Spotify™ app can be launched on the user's smart phone.

Some embodiments of the present disclosure incorporate systems that enable three dimensional tracking of a remote control device. In one exemplary embodiment, a camera system may optically track the remote control device, the remote control device having a combination of gyroscopes, accelerometers, and/or magnetometers, as shown and described in related U.S. patent application Ser. No. 12/426,186, filed Apr. 17, 2009, entitled "Control Device for Communicating Visual Information," which is hereby incorporated by reference for all purposes. The system may determine a location and orientation of the remote control device relative to the camera system. Based on the location and orientation, the system can determine geometrical properties of a ray, or half-infinite line, starting at the remote control device and extending in the direction the remote control device is pointing. Various embodiments provided below demonstrate some examples of a user selecting a device via the determined ray. The remote control device may further comprise one or more buttons, keys, microphones, gyroscopes, accelerometers, and the like for receiving user input to control the selected device.

According to various embodiments of the present disclosure, the spatial remote controlling is based on a predefined map of the physical user environment. The predefined map may be represented as a three dimensional model of the physical user environment, as a set of coordinates associated with properties of each device, or other suitable mapping. Using the instant technology, the user may define a plurality of boundaries of the physical user environment, and can inform the system of a spatial location of each network controllable device, the plurality of boundaries and spatial locations being recorded into the predefined map.

The following detailed description of embodiments includes references to the accompanying drawings, which form a part of the detailed description. Note, the features, structures, or characteristics of embodiments described herein may be combined in any suitable manner in one or more implementations. In the instant description, numerous specific details are provided, such as examples of programming, software modules, user selections, network transactions, hardware modules, hardware circuits, hardware chips, and so forth, to provide a thorough understanding of embodiments. One skilled in the relevant art will recognize, however, that the embodiments can be practiced without one or more of the specific details, or with other methods, components, materials, and so forth. In other instances, well-known structures, materials, or operations are not shown or described in detail to avoid obscuring aspects of the disclosure.

Embodiments of this disclosure will now be presented with reference to accompanying drawings which show blocks, components, circuits, steps, operations, processes, algorithms, and the like, collectively referred to as "elements" for simplicity. These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include microprocessors, microcontrollers, Central Processing Units (CPUs), digital signal processors (DSPs), field programmable gate arrays (FPGAs), programmable logic devices (PLDs), state machines, gated logic, discrete hardware circuits, and other suitable hardware configured to perform various functions described throughout this disclosure. One or more processors in the processing system may execute software, firmware, or middleware (collectively referred to as "software"). The term "software" shall be construed broadly to mean processor-executable instructions, instruction sets, code segments, program code, programs, subprograms, software components, applications, software applications, software packages, routines, subroutines, objects, executables, threads of execution, procedures, functions, and the like, whether referred to as software, firmware, middleware, microcode, hardware description language, or otherwise.

Accordingly, in one or more embodiments, the functions described herein may be implemented in hardware, software, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage, solid state memory, or any other data storage devices, combinations of the aforementioned types of computer-readable media, or any other medium that can be used to store computer executable code in the form of instructions or data structures that can be accessed by a computer.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to." The term "or" is used to refer to a nonexclusive "or," such that "A or B" includes "A but not B," "B but not A," and "A and B," unless otherwise indicated.

Referring now to the drawings, example embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

FIG. 1 shows an example system architecture 100 of a spatially remote controllable environment, according to one example embodiment. System architecture 100 may include an electronic device 105 such as a game console, gaming device, computing device, mobile device, cellular phone, smart phone, tablet computer, desktop computer, laptop computer, workstation, multimedia device, television device, smart television device, and the like. Electronic device 105 may include a processor 110 and a memory 115. Memory 115 can store processor-executable instructions for execution by processor 110. Memory 115 can also store one or more lists of network controllable devices, parameters and settings of each network controllable device, maps of the physical user environment, and so forth. The processor-executable instructions can cause processor 110 to implement at least some operations of the methods as disclosed herein. Electronic device 105 may further include a user interface, such as a graphical user interface, enabling the user to see a visual representation of the maps.

The electronic device 105 may be communicatively coupled to a remote control device 120 via any suitable wireless communication protocol, such as Bluetooth® wireless link, Wi-Fi, infrared link, etc. The electronic device 105, in various embodiments, determines a position and orientation of the remote control device 120. The electronic device 105 is also communicatively coupled to network controllable devices 130 via a wired or wireless network 125. The network 125 is referred to herein as communication network 125 which can refer to any wired, wireless, or optical networks including, for example, the Internet, intranet, local area network (LAN), Personal Area Network (PAN), Wide Area Network (WAN), Virtual Private Network (VPN), cellular phone networks (e.g., packet switching communications network, circuit switching communications network), Bluetooth radio, Ethernet network, an IEEE 802.11-based radio frequency network, IP communications network, or any other data communication network utilizing physical layers, link layer capability, or network layer to carry data packets, or any combinations of the above-listed data networks.

Standard remote controls may use a form of infrared communication between the remote control and the designated device in response to a user pointing the remote control in the direction of the device and actuating a button. The spatial remote control system, on the other hand, uses the position and orientation of the remote control device 120 to determine which network controllable device 130 is being selected. The electronic device 105 may also use the position and orientation of the remote control device 120 to generate a predefined map of the spatial locations of network controllable devices 130 within the physical user environment. The remote control device 120 may be a television remote control, a game controller, a mobile phone, or other mobile device suitable for use with the present technology.

The network controllable devices 130 may include a wide variety of devices that are controllable over a network, including but not limited to smart lights, RGB smart lights, speakers, televisions, thermostats, cameras, meters, irrigation systems, door locks, etc. Each network controllable device 130 may be natively associated with a device identifier and a type of device (including various accepted control inputs, such as on/off for smart lights, color input for RGB smart lights, etc.). In one or more embodiments, the electronic device 105 receives a list of each network controllable device 130 coupled to the network 125, the list comprising the device identifier and the type of device for each network controllable device.

Figure 2:
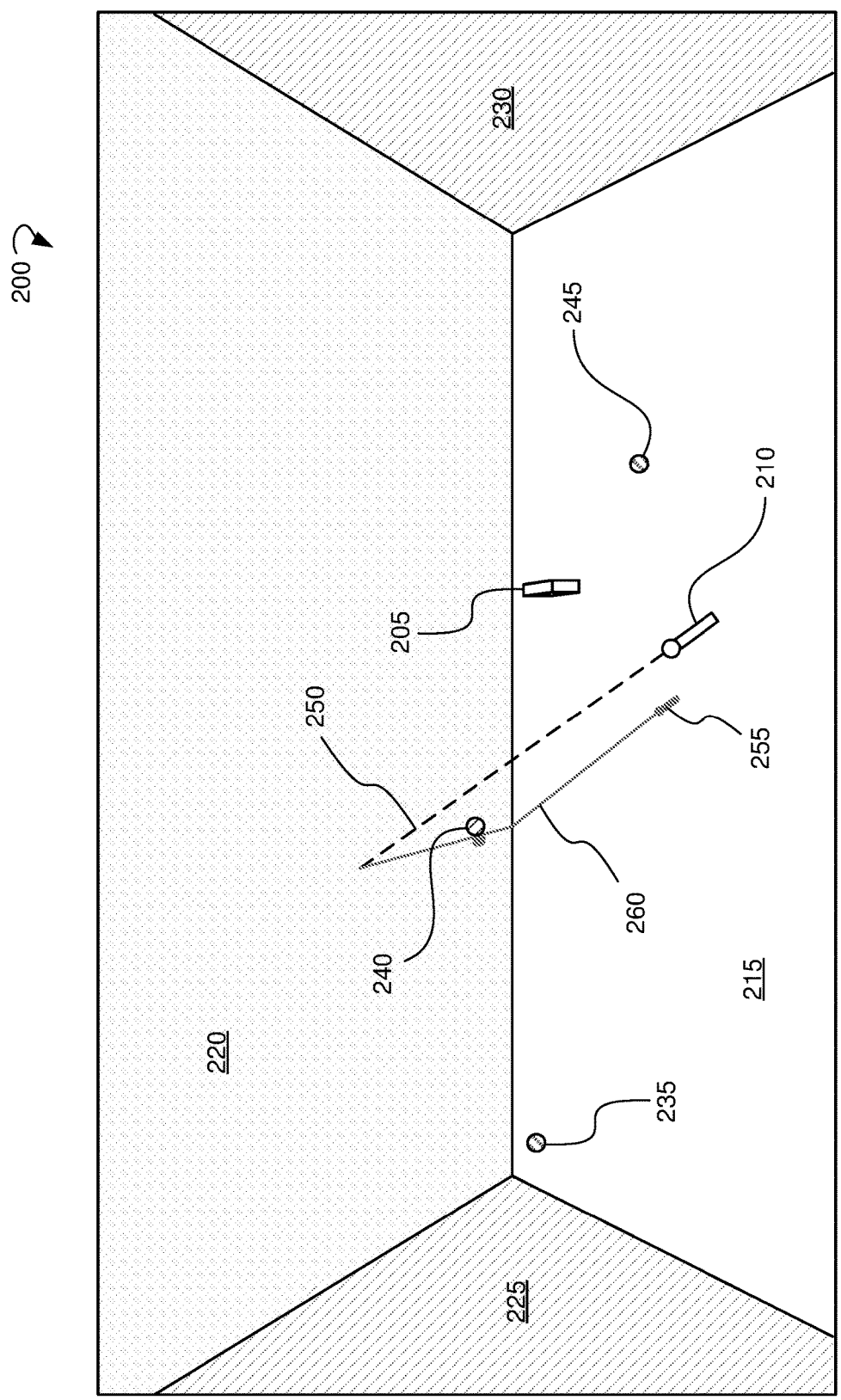
FIG. 2 is a diagrammatic representation of a physical user environment having multiple network controllable devices, in accordance with some embodiments of the present disclosure.

FIG. 2 shows a diagrammatic representation 200 of an exemplary physical user environment according to the present disclosure. The diagrammatic representation 200 may also be part of a graphical user interface generated by the electronic device 105 and displayed to the user. The physical user environment may include an electronic device 205 (e.g., an embodiment of electronic device 105 in FIG. 1), a remote control device 210 (e.g., an embodiment of remote control device 120 in FIG. 1), a floor boundary 215, a plurality of wall boundaries 220, 225, 230, and network controllable devices 235, 240, 245 (e.g., network controllable devices 130).

According to embodiments of the present disclosure, the electronic device 205 determines a position and orientation of the remote control device 210. Based on the position and orientation of the remote control device 210, the electronic device 205 determines a spatial location of a ray 250 originating at the remote control device and extending in the direction the remote control device is pointing. To clarify the three dimensional location of the remote control device 210 and ray 250, the diagrammatic representation 200 may further include shadows 255, 260 respectively.

In certain embodiments, the electronic device 205 is configured to determine spatial locations of the boundaries 215, 220, 225, 230 and each network controllable device 235, 240, 245. The electronic device 205 may store the spatial locations into memory as a predefined map of the physical user environment. An exemplary method for defining the map is shown in FIG. 3.

Thereafter, the electronic device 205 may be configured to track a position and orientation of the remote control device, and to determine a ray based on the tracking. The position and orientation may be relative to a predetermined coordinate system associated with the physical user environment. The electronic device 205 may further be configured to compare the determined ray to the predefined map having the plurality of spatial locations associated with the plurality of network controllable devices. A spatial location of each network controllable device may comprise coordinates defining where the device is located in the physical user environment. Based on the comparing, the electronic device 205 may select a network controllable device of the plurality of network controllable devices corresponding to the determined ray.

Upon receiving a user input from the remote control device 210, the electronic device 205 may transmit a control signal to the selected network controllable device. The particular control signal sent to the selected network controllable device may be dependent upon the type of user input received and the type of network controllable device selected. For example, the user may select a smart light, such as network controllable device 235, by physically pointing the remote control device 210 at the smart light. The user may then actuate a button (or other actuator) on the remote control device 210 to turn on the smart light. The user may then, for example, select an RGB smart light, such as network controllable device 240, by physically pointing the remote control device 210 at the RGB smart light. The user may then actuate the button to turn on the RGB smart light, and move the remote control device 210 along X, Y, and Z axes to manipulate the R, G, and B values, respectively, of the RGB smart light. Other network controllable devices may be controlled in a similar manner. For example, a dimmer functionality a smart light may be controlled to dim or brighten the smart light in response to moving the remote control device 210 along an axis (e.g. the X, Y, or Z axis, an axis of the remote control device, etc.). An exemplary method for spatially remote controlling one or more network controllable devices is shown and described in FIG. 4.

Figure 3:
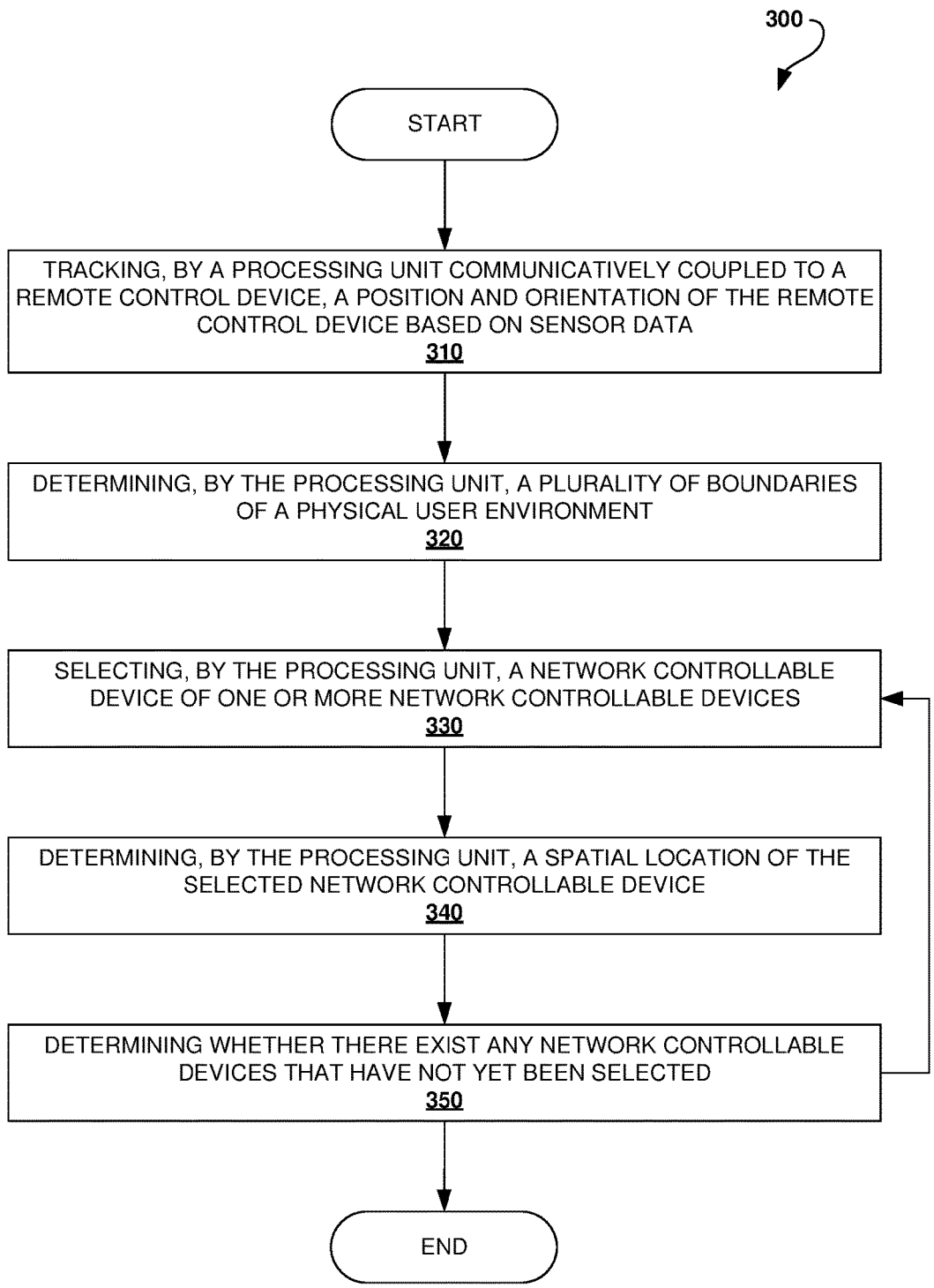
FIG. 3 is a flow chart showing a method for defining a map of network controllable devices in a physical user environment, in accordance with an embodiment of the disclosure.

FIG. 3 is a flow chart showing a method 300 for defining a map of devices in a physical user environment, according to an example embodiment. The method 300 can be implemented by elements of system architecture 100 shown in FIG. 1.

In one or more embodiments, the method 300 commences in block 310 with tracking, by a processing unit communicatively coupled to a remote control device, a position and orientation of the remote control device based on sensor data. The method 300 may include, based on the tracking, determining a ray extending from the remote control device in the direction the remote control device is pointing. The determining of the ray may occur continuously or discretely throughout the method 300.

In block 320, the method 300 may include determining a plurality of boundaries of the physical user environment. The plurality of boundaries may include a floor boundary, a plurality of wall boundaries, and a ceiling boundary. For example, the method 300 may first determine a position of the floor boundary based on the tracking the position of the remote control device based on sensor data. The method 300 may further include, in response to receiving a user input from the remote control device when the remote control device is in contact with a floor of the physical user environment, storing the position of the floor boundary in the map. Alternatively, the electronic device 105 may determine the position of the floor boundary using video processing via a coupled camera, or other suitable method.

In various embodiments, the method 300 determines a first wall boundary of the plurality of wall boundaries based on the position and orientation of the remote control device relative to a sensor, such as a camera system, that provides sensor data. The user points the remote control device at a location where a first wall intersects the floor and actuates a button. In various embodiments, the method determines, based on the determined ray extending from the remote control device, coordinates of the intersection by calculating the intersection of the ray and the floor boundary. The method may assume that the camera system is parallel to the first wall, and that the first wall is perpendicular to the floor boundary. The method may then, based on the coordinates of the intersection and relative orientation to the camera system and the floor boundary, calculate a position of the first wall boundary. In response to receiving a user input from the remote control device, the system stores the position of the first wall boundary into the map.

The process may be repeated to determine the other wall boundaries. For example, the user may then point the remote control device to a location where a second wall intersects the floor. The method may include calculating the coordinates of the intersection of the ray and the floor boundary. In certain embodiments, the method may assume the second wall is perpendicular to both the first wall and the floor boundary, and contains the intersection coordinates. As such, the method then, based on the coordinates of the intersection and orientation to the first wall and floor boundaries, calculate a position of the second wall boundary. In response to receiving a user input, the system may store the position of the second wall boundary into the map.

In certain embodiments, the method includes generating a graphical user interface and displaying a current state of the map. The graphical user interface may display a virtual location of each boundary as the system is determining a position of each boundary. For example, the graphical user interface may display, in real time, the calculated position of the first wall boundary as the user is changing the position and orientation of the remote control device.

In block 330 in the example in FIG. 3, the method 300 may include selecting a network controllable device of one or more network controllable devices. The method may include receiving a list of all network controllable devices coupled to a network. The list may comprise a device identifier and a type of device for each network controllable device. The selecting the network controllable device may be automatic, and each network controllable device of the one or more network controllable devices may be selected one at a time, either in the order presented in the list or other suitable order.

In various embodiments, the method further includes indicating to the user which network controllable device is selected. The indicating may include activating the selected network controllable device (e.g., turning on a selected smart light, playing sound from a selected speaker, flashing a display of the network controllable device, etc.).

In block 340, the method 300 may include determining a spatial location of the selected network controllable device. The user points the remote control device at the selected network controllable device. In response to receiving a first user input, such as a button actuation, the method may determine that the spatial location is at a point along the determined ray extending from the remote control device. In certain embodiments, the system may receive a second user input indicative of the spatial location on the determined ray. For example, the second user input may be movement data of the remote control device indicative of the user physically translating the remote control device either towards or away from the selected network controllable device. Alternatively, the second user input may be a slider, scroll wheel, rotation of the remote control device, or other suitable input for adjusting the position of the spatial location. In various embodiments, the method includes determining, based on the second user input and the determined ray, the spatial location of the selected network controllable device. In response to a third user input, the system may store the determined spatial location into the map and associates the spatial location with the selected network controllable device.

In certain embodiments, the first user input is depressing a button of the remote control device, and the third user input is releasing the button.

In some embodiments, the spatial location of the selected network controllable device may be determined by determining a position of the remote control device, such that the user physically places the remote control device on the network controllable device to indicate where the network controllable device is located.

Furthermore, the graphical user interface may display to the user the currently calculated positions of the ray and the spatial location in real time, relative to the plurality of determined boundaries, so the user may make an informed decision on when to indicate to the system that the currently calculated spatial location corresponds to the physical location of the selected network controllable device.

In decision block 350, the method 300 may include determining whether there exist any network controllable devices that have not yet been selected (e.g., the system has not reached the end of the list of network controllable devices). If so, the method 300, in this example, proceeds to select the next network controllable device at block 330. In various embodiments, if all network controllable devices have been selected, and each has an associated spatial location, the method completes. At this point and according to various embodiments, the map comprises a position of each of the plurality of boundaries, and comprises a spatial location associated with each network controllable device of the plurality of network controllable devices coupled to the network.

Figure 4:
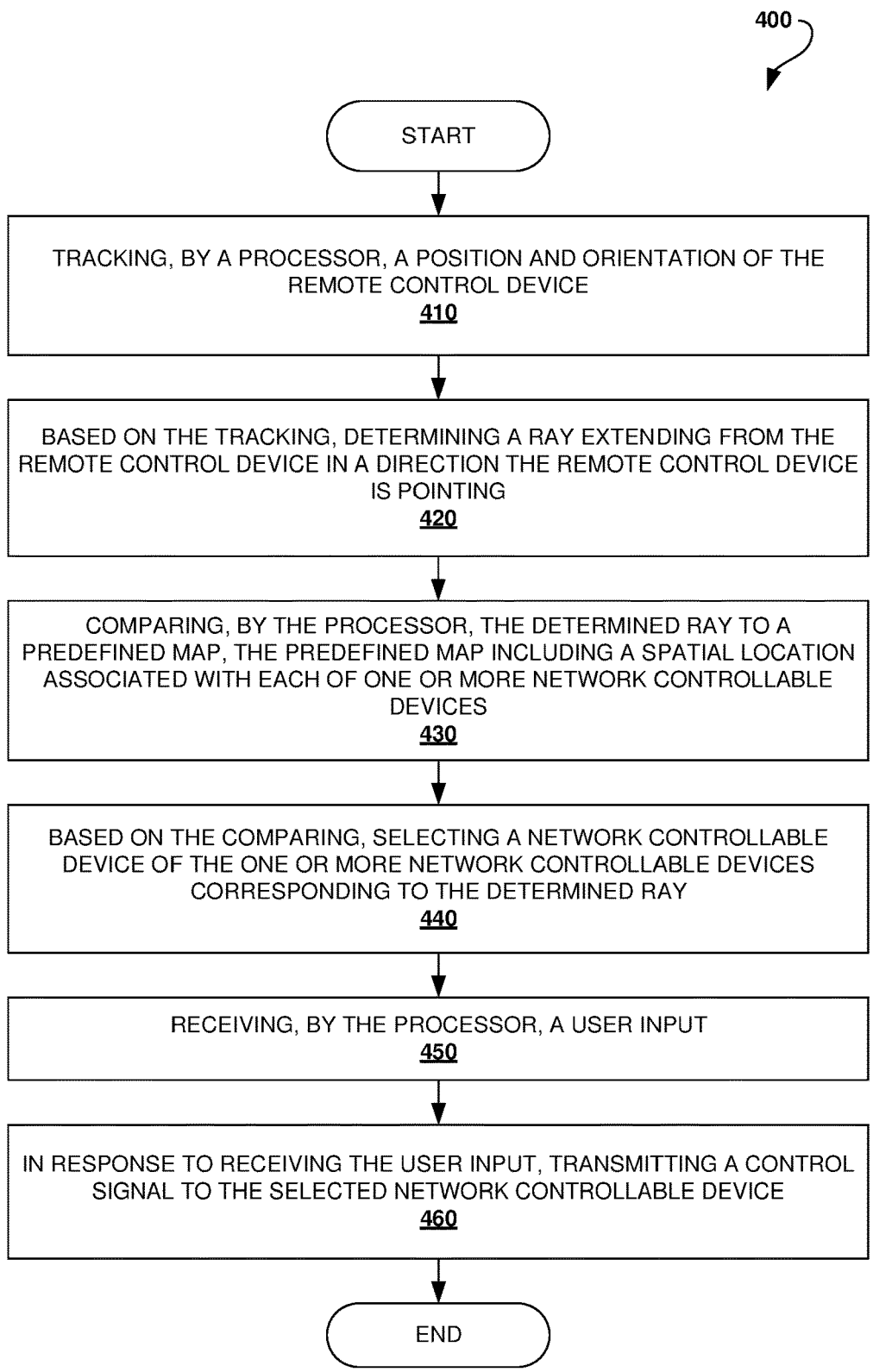
FIG. 4 is a flow chart showing a method for spatially remote controlling one or more network controllable devices, in accordance with some embodiments of the disclosure.

FIG. 4 is a flow chart showing a method 400 for spatially remote controlling network controllable devices, according to an example embodiment. The method 400 can be implemented by elements of system architecture 100 shown in FIG. 1.

The method 400 may commence in block 410 with tracking, by a processor, a position and orientation of a remote control device. In one or more embodiments, the processor is communicatively coupled to the remote control device. The position and orientation may be determined via sensor data from one or more sensors including one or more gyroscopes, accelerometers, and/or magnetometers. The position and orientation may be additionally and/or alternatively determined based on video processing via sensor data from one or more camera systems. The position and orientation may be relative to a coordinate system of a predefined map associated with a physical user environment. It is to be understood that the remote control device may include any suitable object having a position and orientation that may be tracked. For example, tracking may include determining a position and orientation of a user's hand, via one or more camera systems, as the user points around the physical user environment. In a further example, tracking may include determine a position and orientation of the user's eyes.

In block 420, the method 400 may include, based on the tracking, determining a ray originating at the remote control device and extending in a direction the remote control device is pointing.

In block 430, the method 400 may proceed with comparing, by the processor, the determined ray to the predefined map, the predefined map including a spatial location associated with each of one or more network controllable devices. Each network controllable device of the one or more network controllable devices physically exists within the physical user environment in various embodiments. A spatial location of each network controllable device may comprise coordinates defining where the network controllable device is located in the physical user environment. Furthermore, the predefined map may comprise any suitable data format. For example, the predefined map may comprise a lookup table associating a device ID, a spatial location, and a type of each network controllable device. It is to be understood that the predefined map may further comprise other device-specific information and/or information regarding the physical user environment.

The step of comparing may include comparing the ray with each spatial location stored in the predefined map, and, in certain embodiments, may further include calculating a point-line distance between the ray and each spatial location. The point-line distance may also be referred to as the perpendicular distance, i.e., the shortest distance between the spatial location and the ray. The point-line distance may be calculated in various ways known to those skilled in the art.

Alternatively, comparing the determined ray to a predefined map may include calculating a volume centered about the ray, and determining whether each spatial location stored in the predefined map is disposed within the volume. For example, the volume may be a right cone having a vertex at the origin of the ray, an axis coincident with the ray, and a predetermined opening angle (e.g., a flash light beam originating at the remote control device pointed in the direction of the ray).

In block 440, the method 400 may include, based on the comparing, selecting a network controllable device of the one or more network controllable devices corresponding to the determined ray. In various embodiments, selecting a network controllable device corresponding to the determined ray includes determining which network controllable device is disposed closest to the ray. The network controllable device disposed closest to the ray may be determined by, based on calculating the distance of each spatial location in the predefined map, selecting the minimum point-line distance between the ray and the spatial location.

Alternatively, selecting the network controllable device corresponding to the determined ray includes selecting, of the network controllable devices disposed within the calculated volume, a network controllable device closest to the remote control device.

In block 450, the method 400 may then include receiving, by the processor, a user input. The user input may comprise one or more of a button actuation, voice control, movement of the remote control device, gesture, eye tracking, or other suitable user input.

In block 460, the method 400 may include, in response to receiving the user input, transmitting a control signal to the selected network controllable device. The particular control signal transmitted may depend on the user input and the type of selected network controllable device. For example, if the selected network controllable device is a smart light, actuation a button on the remote control device may turn on the smart light. Alternatively, if the selected network controllable device is an RGB smart light, moving the remote control device along X, Y, and Z axes may correspond to R, G, and B values, respectively, of the control signal transmitted to the RGB smart light.

In some embodiments, the method 400 may be repeated to perform a spatial "drag and drop" action in which the user may select a first network controllable device and perform a spatial "drag" to a second network controllable device. In general, the spatial "drag and drop" action may couple an output of the first network controllable device to an input of the second network controllable device. For example, the user may select and drag a stereo system to a speaker. A control signal transmitted to the stereo system would include instructions to couple the stereo system to the speaker. In a further example, the user may select and drag a stereo system to a light, which may couple one or more outputs of the stereo system (e.g. volume, pitch, tempo, etc.) to a brightness or color of the light.

In certain embodiments, the spatial "drag and drop" action copies an output or an input of the first network controllable device to the second network controllable device. For example, dragging from a first light to a second light may copy a state (e.g. brightness or color) of the first light to the second light. In another example, dragging from a first speaker to a second speaker may copy an audio signal input coupled to the first speaker and make it also coupled to the second speaker.

The spatial "drag and drop" action may comprise initially performing blocks 410-450 of method 400 to select a first network controllable device and to receive a first user input. Blocks 410-450 may then be repeated to select a second network controllable device and to receive a second user input. Transmitting a control signal to one or both of the first and the second network controllable device may then occur at block 460. The control signal may be associated with instructions to couple one or more inputs, outputs, or states of the first network controllable device to one or more inputs, outputs, or states of the second network controllable device, and any combination thereof.

The first user input may comprise actuating a drag button, and the second user input may comprise releasing the drag button. Alternatively, the first user input may comprise actuating a combination of buttons (for example, buttons on opposing sides of the remote control device to imitate a grab action), and the second user input may comprise releasing the combination of buttons. To accomplish a drag vs. a simple on/off action might require a second button, or a button combination. It is to be understood that the first and the second user input may comprise any suitable user input as described herein.

Figure 5:
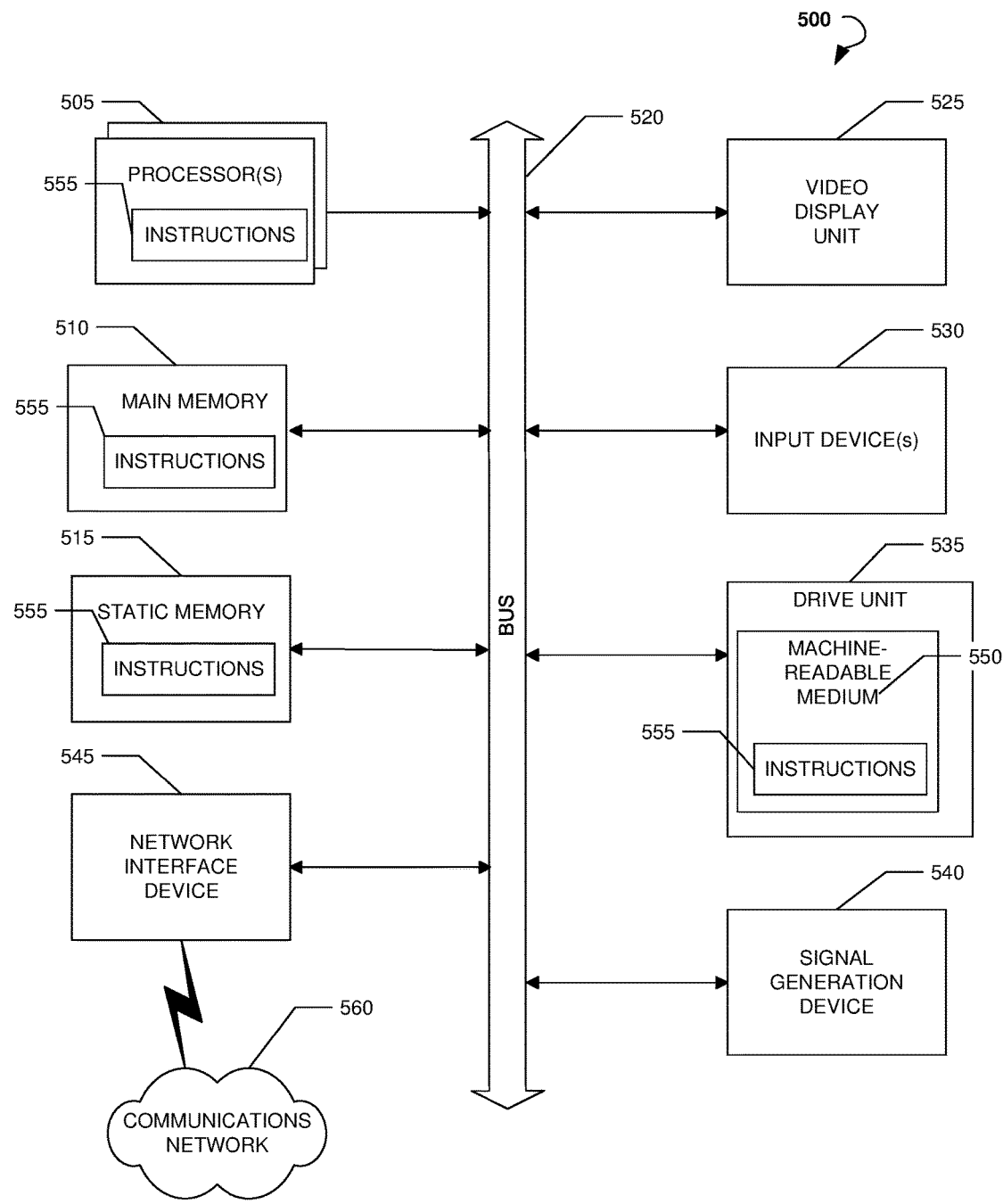
FIG. 5 is a diagrammatic representation of an example machine in the form of a computer system within which a set of instructions for the machine to perform any one or more of the methodologies discussed herein is executed.

FIG. 5 shows a diagrammatic representation of a computing device for a machine in the example electronic form of a computer system 500, within which a set of instructions for causing the machine to perform any one or more of the methodologies discussed herein can be executed. In example embodiments, the machine operates as a standalone device, or can be connected (e.g., networked) to other machines. In a networked deployment, the machine can operate in the capacity of a server, a client machine in a server-client network environment, or as a peer machine in a peer-to-peer (or distributed) network environment. The machine can be a personal computer (PC), tablet PC, set-top box (STB), cellular telephone, portable music player (e.g., a portable hard drive audio device, such as a Moving Picture Experts Group Audio Layer 3 (MP3) player), web appliance, network router, switch, bridge, or any machine capable of executing a set of instructions (sequential or otherwise) that specify actions to be taken by that machine. Further, while only a single machine is illustrated, the term "machine" shall also be taken to include any collection of machines that separately or jointly execute a set (or multiple sets) of instructions to perform any one or more of the methodologies discussed herein.

The example computer system 500 includes a processor or multiple processors 505 (e.g., a central processing unit (CPU), a graphics processing unit (GPU), or both), and a main memory 510 and a static memory 515, which communicate with each other via a bus 520. The computer system 500 can further include a video display unit 525 (e.g., a liquid crystal display (LCD), organic light emitting diode (OLED) display, or a cathode ray tube (CRT)). The computer system 500 also includes at least one input device 530, such as an alphanumeric input device (e.g., a keyboard), a cursor control device (e.g., a mouse), a microphone, a digital camera, a video camera, and so forth. The computer system 500 also includes a disk drive unit 535, a signal generation device 540 (e.g., a speaker), and a network interface device 545.

The drive unit 535 (also referred to as the disk drive unit 535) includes a machine-readable medium 550 (also referred to as a computer-readable medium 550), which stores one or more sets of instructions and data structures (e.g., instructions 555) embodying or utilized by any one or more of the methodologies or functions described herein. The instructions 555 can also reside, completely or at least partially, within the main memory 510 and/or within the processor(s) 505 during execution thereof by the computer system 500. The main memory 510 and the processor(s) 505 also constitute machine-readable media.

The instructions 555 can further be transmitted or received over a communications network 560 via the network interface device 545 utilizing any one of a number of well-known transfer protocols (e.g., Hyper Text Transfer Protocol (HTTP), CAN, Serial, and Modbus). The communications network 560 includes the Internet, local intranet, Personal Area Network (PAN), Local Area Network (LAN), Wide Area Network (WAN), Metropolitan Area Network (MAN), virtual private network (VPN), storage area network (SAN), frame relay connection, Advanced Intelligent Network (AIN) connection, synchronous optical network (SONET) connection, digital T1, T3, E1 or E3 line, Digital Data Service (DDS) connection, Digital Subscriber Line (DSL) connection, Ethernet connection, Integrated Services Digital Network (ISDN) line, cable modem, Asynchronous Transfer Mode (ATM) connection, or an Fiber Distributed Data Interface (FDDI) or Copper Distributed Data Interface (CDDI) connection. Furthermore, communications also includes links to any of a variety of wireless networks including Wireless Application Protocol (WAP), General Packet Radio Service (GPRS), Global System for Mobile Communication (GSM), Code Division Multiple Access (CDMA) or Time Division Multiple Access (TDMA), cellular phone networks, Global Positioning System (GPS), cellular digital packet data (CDPD), Research in Motion, Limited (RIM) duplex paging network, Bluetooth radio, or an IEEE 802.11-based radio frequency network.

While the machine-readable medium 550 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, XML, Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, C#, .NET, Adobe Flash, Perl, UNIX Shell, Visual Basic or Visual Basic Script, Virtual Reality Markup Language (VRML), ColdFusion™ or other compilers, assemblers, interpreters, or other computer languages or platforms.

Thus, the technology for modular virtual reality tracking is disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for spatially remote controlling a network controllable device in a physical user environment, the method comprising:
   tracking, by a processor, a position and orientation of a remote control device based on sensor data;
   based on the tracking, determining a geometric ray extending from the remote control device in a direction the remote control device is pointing;
   comparing, by the processor, the determined geometric ray to a predefined map, the predefined map including a spatial location associated with each of one or more network controllable devices, constructing of the predefined map including:
      determining, based on the position and orientation of the remote control device, a plurality of boundaries of the physical user environment; and
      determining, based on the position and orientation of the remote control device in response to a user pointing the remote control device at each of the one or more network controllable devices in turn, the spatial location associated with each of the one or more network controllable devices;
   based on the comparing, selecting one of the one or more network controllable devices corresponding to the determined geometric ray;
   receiving, by the processor, a user input; and
   in response to receiving the user input, transmitting a control signal to the selected one of the one or more network controllable devices.

2. The method as recited in claim 1, wherein determining a plurality of boundaries includes:
   determining a floor boundary; and
   determining a wall boundary based on an intersection of the geometric ray and the floor boundary.

3. The method as recited in claim 1, further comprising receiving a list of the one or more network controllable devices coupled to a network, wherein the list of the one or more network controllable devices includes a device identifier and a type of device for each of the one or more network controllable devices.

4. The method as recited in claim 1, wherein the constructing the predefined map further includes activating each of the one or more network controllable devices.

5. The method as recited in claim 1, wherein determining the spatial location associated with each of the one or more network controllable devices includes determining a point along the geometric ray corresponding to a physical location of the each of the network controllable devices.

6. The method as recited in claim 1, further comprising generating a graphical user interface to display the predefined map as the predefined map is being constructed.

7. The method as recited in claim 6, wherein the graphical user interface includes at least one of the plurality of boundaries.

8. The method as recited in claim 6, wherein the graphical user interface includes currently calculated positions of the geometric ray and the spatial location associated with each of the one or more network controllable devices in real time.

9. The method as recited in claim 1, wherein the comparing further includes calculating a point-line distance between the geometric ray and each spatial location.

10. The method as recited in claim 9, wherein the selecting further includes determining which of the one or more network controllable devices is disposed closest to the geometric ray, wherein the selected one of the one or more network controllable devices is the closest determined network controllable device.

11. The method as recited in claim 1, wherein the comparing further includes calculating a volume centered about the geometric ray and determining whether each of the spatial locations stored in the predefined map is disposed within the volume.

12. The method as recited in claim 11, wherein the selecting further includes determining which of the one or more network controllable devices disposed within the volume is disposed closest to the remote control device, wherein the selected one of the one or more network controllable devices is the closest determined network controllable device.

13. The method as recited in claim 1, wherein the received user input includes one or more of a button actuation, voice control, movement of the remote control device, and a gesture.

14. The method as recited in claim 13, wherein the remote control device comprises a smart phone that includes a number of executable applications, and wherein, in response to receiving the user input, transmitting a control signal to the selected network controllable device comprises:
   causing launching of an application on the smart phone that corresponds to the selected network controllable device.

15. The method of claim 1, wherein the sensor data is acquired by one or more camera systems and at least one of a gyroscope of the remote control device, an accelerometer of the remote control device, or a magnetometer of the remote control device.

16. The method of claim 1, further comprising generating a graphical user interface to display the predefined map as the predefined map is being constructed,
   wherein the graphical user interface includes at least one of the plurality of boundaries, and
   wherein the graphical user interface includes currently calculated positions of the geometric ray and the spatial location associated with each of the one or more network controllable devices in real time.

17. A system for spatially remote controlling a network controllable device in a physical user environment, the system comprising:
   a remote control device;
   a network coupled to one or more network controllable devices;
   at least one processor; and
   a memory storing processor-executable instructions, wherein the at least one processor is configured to implement the following operations upon executing the processor-executable instructions:
   tracking, by the at least one processor, a position and orientation of the remote control device based on sensor data acquired by one or more camera systems, a gyroscope, an accelerometer, or a magnetometer of the remote control device;
   based on the tracking, determining a geometric ray extending from the remote control device in a direction the remote control device is pointing;
   comparing, by the processor, the determined geometric ray to a predefined map, the predefined map including a spatial location associated with each of the one or more network controllable devices, constructing of the predefined map including:
      determining, based on the position and orientation of the remote control device, a plurality of boundaries of the physical user environment;
      receiving a list of the one or more network controllable devices coupled to a network; and
      determining, based on the position and orientation of the remote control device in response to a user pointing the remote control device at each of the one or more network controllable devices in turn, the spatial location associated with each of the one or more network controllable devices;
   based on the comparing, selecting one of the one or more network controllable devices corresponding to the determined geometric ray;
   receiving, by the processor, a user input; and
   in response to receiving the user input, transmitting a control signal to the selected one of the one or more network controllable devices.

18. The system of claim 17, wherein the one or more network controllable devices includes one or more of a smart light, a speaker, a television, a thermostat, a camera, a meter, an irrigation system, and a door lock.

19. The system of claim 17, wherein the predefined map includes, for each of the one or more network controllable devices, a device ID, a spatial location, and a type of device.

20. The system of claim 17, further comprising the one or more camera systems, the position and orientation of the remote control device determined relative to the one or more camera systems.

21. A non-transitory processor-readable medium having instructions stored thereon, which when executed by one or more processors, cause the one or more processors to implement a method for spatially remote controlling a network controllable device in a physical user environment, the method comprising:
   tracking, by a processor, a position and orientation of a remote control device based on sensor data acquired by (i) one or more of a gyroscope, accelerometer, and a magnetometer of the remote control device, and (ii) one or more camera systems;
   based on the tracking, determining a geometric ray extending from the remote control device in a direction the remote control device is pointing;
   comparing, by the processor, the determined geometric ray to a predefined map, the predefined map including a spatial location associated with each of one or more network controllable devices, constructing of the predefined map including:
      determining, based on the position and orientation of the remote control device, a plurality of boundaries of the physical user environment;

receiving a list of the one or more network controllable devices coupled to a network; and determining, based on the position and orientation of the remote control device, the spatial location associated with each of the one or more network controllable devices;

based on the comparing, selecting one of the one or more network controllable devices corresponding to the determined geometric ray;

receiving, by the processor, a user input; and in response to receiving the user input, transmitting a control signal to the selected one of the one or more network controllable devices.

* * * * *